(12) United States Patent
Lavian et al.

(10) Patent No.: US 6,976,054 B1
(45) Date of Patent: Dec. 13, 2005

(54) METHOD AND SYSTEM FOR ACCESSING LOW-LEVEL RESOURCES IN A NETWORK DEVICE

(75) Inventors: Tal Isaac Lavian, Sunnyvale, CA (US); Robert James Duncan, San Francisco, CA (US); Robert F. Jaeger, Silver Spring, MD (US)

(73) Assignee: Nortel Networks Limited, St. Laurent (CA)

( * ) Notice: Subject to any disclaimer, the term of this patent is extended or adjusted under 35 U.S.C. 154(b) by 812 days.

(21) Appl. No.: 09/753,359

(22) Filed: Dec. 29, 2000

(51) Int. Cl.[7] .......................................... G06F 15/16
(52) U.S. Cl. ................. 709/203; 370/349; 370/401; 370/466
(58) Field of Search ........................... 709/203, 224, 709/230; 370/473, 392, 349, 401, 466

(56) References Cited

U.S. PATENT DOCUMENTS

| | | | |
|---|---|---|---|
| 5,732,213 A | * | 3/1998 | Gessel et al. ............... 709/224 |
| 6,138,143 A | * | 10/2000 | Gigliotti et al. ............ 709/203 |
| 6,246,683 B1 | * | 6/2001 | Connery et al. ............ 370/392 |
| 6,542,734 B1 | * | 4/2003 | Abrol et al. .............. 455/412.1 |
| 6,711,178 B1 | * | 3/2004 | O'Gorman et al. ......... 370/473 |

* cited by examiner

Primary Examiner—Viet D. Vu
Assistant Examiner—Jinsong Hu
(74) Attorney, Agent, or Firm—Withrow & Terranova, PLLC

(57) ABSTRACT

A method and system provides access to information about a resource associated with a network device. The method and system selects a layer for communicating with the requested resource associated with the network device in a network protocol stack having multiple layers, establishes an inner layer socket for communicating at the selected layer using an inner layer application programming interface (IL API) and a socket identifier associated with the requested resource, wherein the inner layer socket communicates using the selected layer and bypasses other layers in the network protocol stack, transmits the request for information about the resource through the inner layer socket and the socket identifier, receives the information about the resource in response to the transmission made through the inner layer socket, and passes the information about the resource through the inner layer socket to the application making the request.

32 Claims, 6 Drawing Sheets

METHOD AND SYSTEM FOR ACCESSING LOW-LEVEL RESOURCES IN A NETWORK DEVICE

FIELD OF THE INVENTION

The present invention relates to the field of computer data networking and a method and system for accessing low-level resources in a network device.

BACKGROUND OF THE INVENTION

The use of layered data communications protocols promotes system interoperability, vendor portability and simplicity in system integration. Each protocol layer operates at a different layer of abstraction and performs different types of data manipulation and formatting. Because each layer is concerned with events at its own level of abstraction, different software designers can work together to design the protocols. Layers of the network protocol can also replaced individually without significant communication incompatibilities problems arising.

The Internet Protocol (IP) stack or IP stack is a widely used layered communication protocol. Applications use the IP stack to transmit and receive data over a variety of different local and wide area networks. Typically, a transmitting application passes application data to a transport layer in the IP stack, which in turn adds routing information to the data and passes the results to a data link layer. The data link layer also adds additional header information and passes the resulting information to a physical layer, where it is finally transmitted over the network.

A receiving application associated with a receiving IP stack receives and processes the information. Each layer of the receiving IP stack performs various communication functions and format conversions in reverse going from the physical layer, the data link layer, the network layer, the transport layer, and then to the receiving application. In a conventional network, applications send and receive messages from each other and use the IP stack as a conduit for data. Notwithstanding these messages, other information being transmitted between the sending and receiving IP stacks is not typically made available to either the sending or receiving applications.

While layered protocols such as used in a conventional IP stack have some advantages, they are typically obtained by lowering programmatic flexibility. For example, application data is encapsulated with protocol-generated headers whose content cannot be accessed and controlled by the application itself. Applications are masked from the inner operation of a network protocol and network operation. This inflexibility makes it difficult for an application to send data encapsulated with a non-standard header when required or monitor operation of the network.

SUMMARY OF THE INVENTION

In one aspect of the invention, a method and system provides access to information about a resource associated with a network device. The method and system receives a request from an application for information about a resource associated with a network device, selects a layer in a network protocol stack having multiple layers for communicating with the requested resource associated with the network device, establishes an inner layer socket for communicating at the selected layer using an inner layer application programming interface (IL API) and a socket identifier associated with the requested resource, wherein the inner layer socket communicates using the selected layer and bypasses other layers in the network protocol stack, transmits the request for information about the resource through the inner layer socket and the socket identifier, receives the information about the resource in response to the transmission made through the inner layer socket, and passes the information about the resource through the inner layer socket to the application making the request.

BRIEF DESCRIPTION OF THE DRAWINGS

The features and aspects of the present invention will become more fully apparent from the following detailed description, appended claims, and accompanying drawings in which:

DETAILED DESCRIPTION OF THE INVENTION

Figure 1:
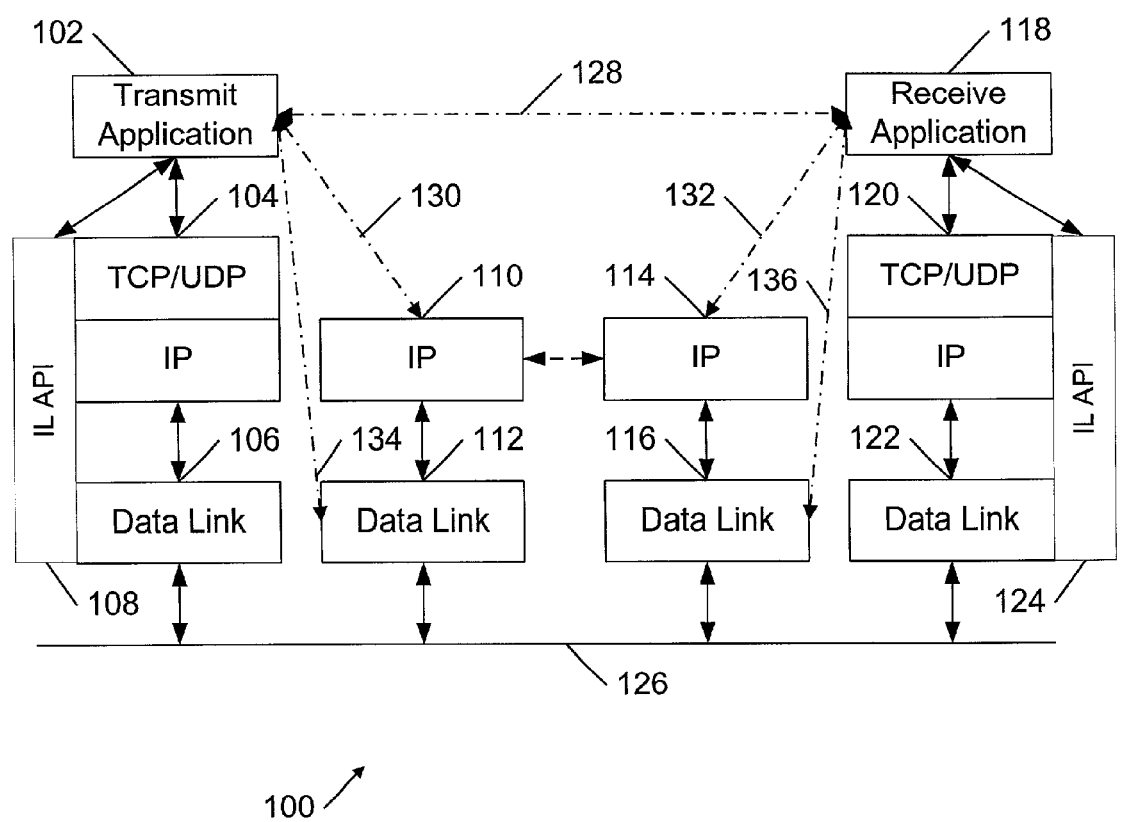
FIG. 1 is a block diagram illustrating a network using an inner layer application programming interface (IL API) to communicate between nodes on the network.

FIG. 1 is a block diagram illustrating a network 100 using an inner layer application programming interface (IL API) to communicate between nodes on network 100. Network 100 includes a transmit application 102 with a corresponding TCP/IP stack 104, a data link layer 106 and an inner layer application programming interface (IL API) 108 facilitating communication between transmit application 102 and layers within TCP/IP stack 104. Further, network 100 also includes a first intermediate gateway or router node represented by IP stack 110 and data link layer 112 and a second intermediate gateway or router node represented by IP stack 114 and data link layer 116. Receive application 118 in network 100 has a TCP/IP stack 120, data link layer 122 and an IL API 124. Physical connection 126 provides connection to each of these nodes through their respective data link layers using a physical access protocol such as Carrier Sense Multiple Access/Collision Detect (CSMA/CD).

Conventional layered communications provides applications with application-to-application or peer-to-peer communication capabilities. Information at the lower layers of the protocol stack are masked from the application through abstract interfaces. This simplifies network programming over the IP stack but does not provide much flexibility if access to these other layers is desired. IL API 108 and IL API 124 provides this communication capability to both transmit application 102 and receive application 118. For example, transmit application 102 and receive application 118 have access to IP stack 110 and IP stack 114 directly using their respective IL API. Additionally, transmit application 102 and receive application 118 also have access to other protocol layers, such as data link layer 112 and data link layer 116, using their respective IL API.

Figure 2:
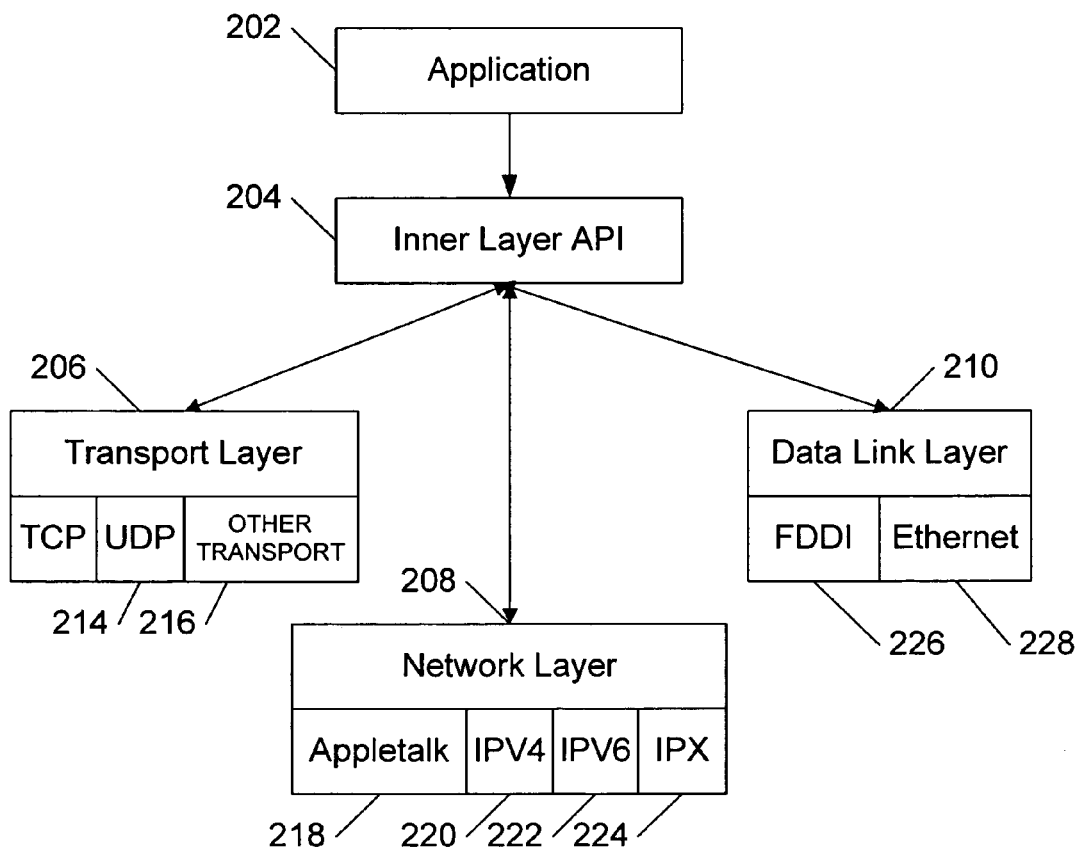
FIG. 2 is a block diagram demonstrating the various protocols an application can interface with using the IL API.

FIG. 2 illustrates many different types of network information available at these different layers in the protocol stack. This block diagram illustrates an application 202 passing through an IL API 204 to gain access to a transport layer 206, a network layer 208, and a data link layer 210. At transport layer 206, application 202 has access to the transport protocols TCP 212, UDP 214, and other transport 216. TCP 212 or Transmission Control Protocol is a connection-oriented protocol that provides a reliable, full-duplex, byte stream for a user process. Most conventional Internet applications use TCP 212 and allow TCP 212 to interface with the IP layers below. UDP 214 or User Datagram Protocol is a connectionless protocol also for user processes, however, it does not guarantee that UDP datagrams will ever reach their intended destination. Because TCP and UDP both access the 1P layer the protocol is often referred to as simply TCP/IP.

Network layer 208 provides application 202 with access through IL API 204 to information carried over Appletalk 218, IPv4 220, IPv6 222, and IPX 224. These protocols provide packet delivery services and routing capabilities for transport protocols such as TCP 212 and UDP 214. Networks based on Appletalk 218 and IPX 224 can be integrated to work with the TCP and UDP transport protocols. In addition, routers, switches, hubs and other network devices exchange status and network routing information describing network layer resources using ICMP (Internet Control Message Protocol) and IGMP (Internet Gateway Message Protocol). Appletalk 218 provides packet delivery services primarily to computers designed by Apple Computer of Cupertino, Calif. IPv4 220 (version 4) provides 32-bit addresses and IPv6 222 (version 6) provides 64-bit addresses in the Internet Protocol (IP) defined in specification DOD-STD-1777. Further references to the IP protocol includes these additional protocols described above.

Application 202 also has access to data link layer 210 through IL API 204. Fiber distributed data interface (FDDI) protocol 226 is a standard for data transmission on fiber optic lines in a local area network. FDDI protocol 226 is based on the token ring protocol and in addition can support thousands of users. In addition, application 202 can also access information from Ethernet 228 through IL API 204. Ethernet 228 is a widely-installed local area network technology and specifies sharing physical access over coaxial cable or special grades of twisted pair wires providing a wide range of transmission speeds. Devices connected to an Ethernet network generally compete for access to the physical medium using the CSMA/CD protocol.

Figure 3:
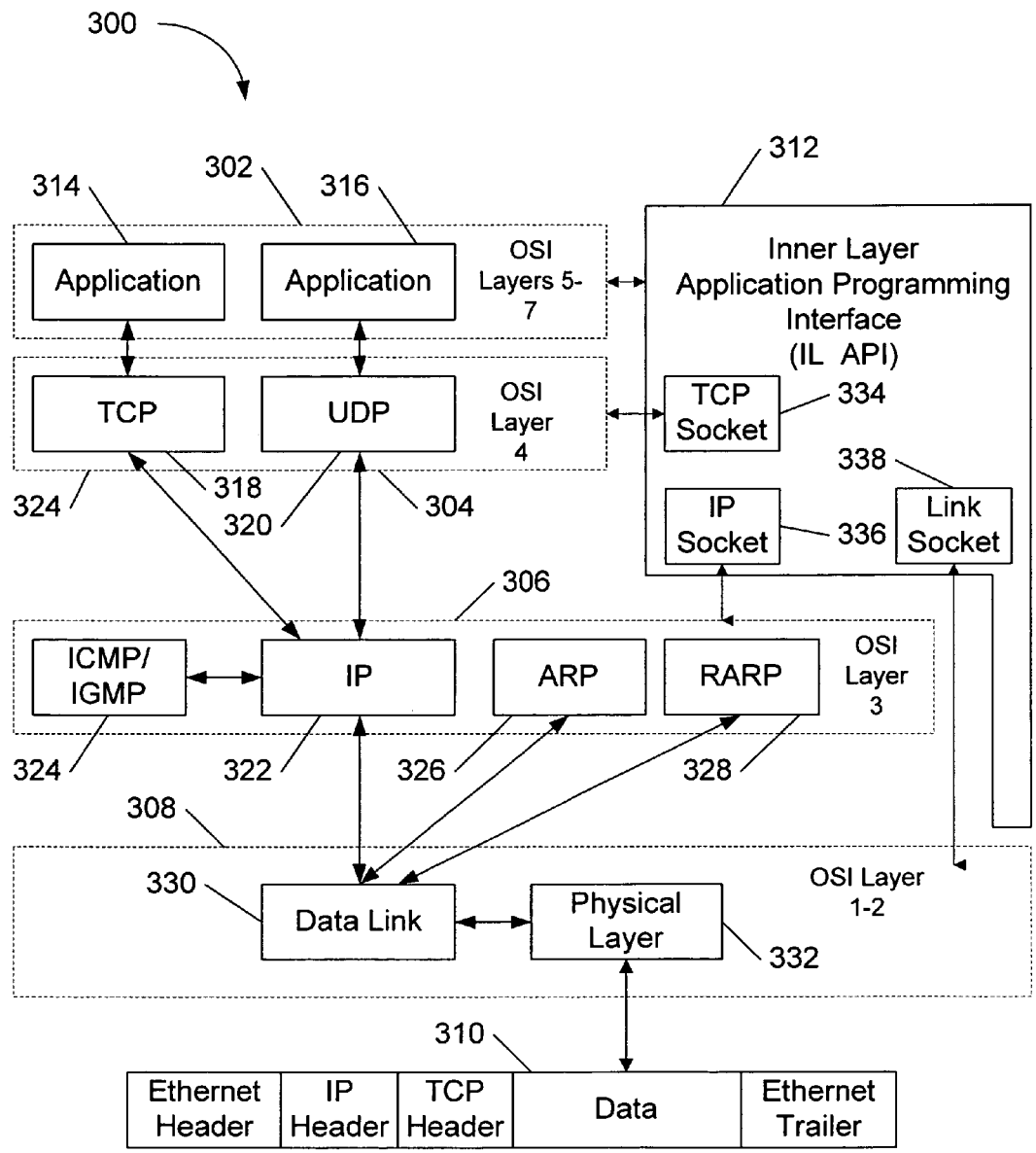
FIG. 3 is a block diagram illustrating how the IL API works to provide access to the Internet Protocol (IP) stack.

FIG. 3 is a block diagram illustrating how the IL API works to provide access to a Internet Protocol (IP) stack 300. IP stack 300 includes application 302, transport layer 304, network layer 306, data link layer 308 each connected to IL API 312. In one implementation, layers in IP stack 300 produce an Ethernet packet 310 with a data payload and headers from each of the various layers.

In conventional network communication, application 314 and application 316 communicate directly with a network protocol with either TCP 318 or UDP 320 for a connection or connectionless type communication. As an alternative, both application 314 and application 316 can communicate with transport layer 304 through TCP Socket 334 in IL API 312. Using IL API 312 to access the transport layer as well as other inner layers of the network protocol provides a more uniform interface to the stack.

Application 314 and application 316 can use IL API 312 to access network layer 306 and data link layer 308 in ways previously unavailable. For example, application 314 can access Internet Control Message Protocol (ICMP)/Internet Group Multicast Protocol (IGMP) 324 resources and interact with routers, switches, hubs, gateways, and hosts communicating with each other about errors and system control. ICMP provides message control and error-reporting protocol between a host server and a gateway to the Internet. ICMP uses Internet Protocol (IP) datagrams that IL API 312 provides to an application. On conventional systems, this information is processed by the TCP/IP protocol and is not available directly to the application. IGMP is used to support multicasting between nodes on a network and provides information to applications through IL API 312 in a similar manner. Application 314 also has access to ARP 326 and RARP 328 resources. Application 314 opens a socket using IP Socket 336 interface and establishes a direct connection with network layer 306. Because application 314 bypasses transport layer 318, ARP 326 and RARP 328 resources are exposed and available for application 314 to process. For example, ARP 326 resources include Media Access Control (MAC) addresses associated with each Ethernet device on a network.

Application 314 operates in a similar manner with respect to data link layer 308. To gain access to data link layer 308, application 314 establishes a session directly to data link layer 308 through link socket 338. Once the session through link socket 338 is created, application 314 has access to information in data link layer 330 and physical layer 332. For example, application 314 can create customized headers for an Ethernet packet 310 creating TCP Header and IP Header as illustrated in Ethernet packet 310 in FIG. 3. Ethernet header and Ethernet trailer are added by an Ethernet type data link layer 330. This provides an application with additional flexibility when developing network management software or developing other routines that need access to lower layers of the network protocol stack.

Figure 4:
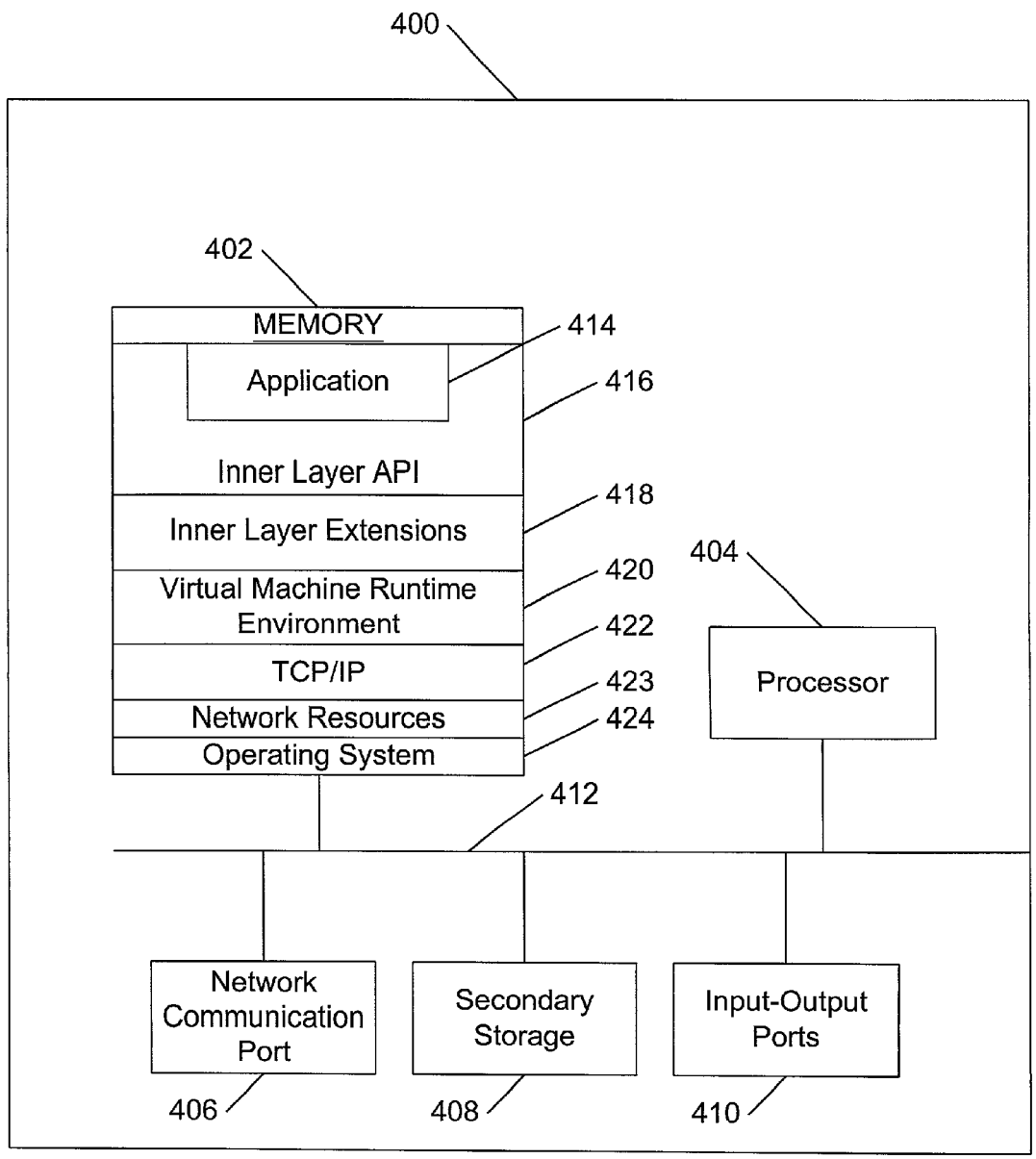
FIG. 4. is a block diagram depicting a computer system that provides the IL API and IP stack to applications.

FIG. 4. is a block diagram depicting a computer system 400 that provides the IL API and IP stack to applications. Computer system includes a memory 402, a processor 404, a network communication port 406, a secondary storage 408, and input-output ports 410. Processor can be a general purpose processor such as manufactured by Intel Corporation of Santa Clara, Calif. or can be a specialized ASIC or other type of processor device. Network communication port 406 can be implemented as a Ethernet card or built-in communication port on a computer and secondary storage 408 is a hard-disk, CDROM, or other mass storage device. Input-output ports 410 includes ports for corresponding peripheral devices such as keyboard, mouse, printer, display, and scanner.

Memory 402 includes an application 414, an inner layer API (IL API) 416, inner layer extensions 418, virtual machine runtime environment 420, TCP/IP protocol 422, network resources 423 and operating system 424. Application 414 is an application that can access one or more different layers of a network protocol stack such as TCP/IP protocol 422. Generally, application 414 should be a user application but may need to be run with increased permissions such as "root" or "superuser" due to the sensitive information accessible within the inner layers of TCP/IP protocol 422.

Inner layer API 416 is the interface routines linked into application 414 that provides direct access to the transport, the network, data link layers and physical layers in the protocol stack. Inner layer extensions 418 include any supporting routines necessary to make the IL API 416 available on the given platform. In some cases, this could involve recompiling an operating system kernel to include these particular functionalities not previously available to applications. In an object-oriented implementation, such as using the Java programming language by Sun Microsystems of Mountain View, Calif., these extensions can be dynamically loaded at run-time or immediately when they are loaded into the overall system. Because Java allows dynamic loading of routines, inner layer extensions 418 can be loaded as application 414 requires.

Virtual machine runtime environment 420 is typically used with an object-oriented programming language such as Java. If a non-object oriented or interpreted programming language is not being used, then virtual machine runtime environment 420 may not be required. For Java, a Java Virtual Machine or JVM simulates a virtual machine and provides hardware independent computing capabilities in addition to dynamic loading of libraries, applications, and applets in real-time over a network.

TCP/IP 422 is the conventional layered protocol stack typically available on most computers and computer-like platforms. As previously mentioned, TCP/IP generally only provides applications with access to the transport layer but with IL API 416, application 414 accesses the network layer, the data link layer, and the physical layer in addition to the transport layer. Network resources 423 represents the various tables and other network resources on a network device. These resources include information stored in routing tables, ARP tables, ICMP/IGMP related tables, tables for storing physical port information and any other tables or resources used to manage and or describe an aspect of a network device.

Operating system 424 manages resources on computer system 400 so they are used efficiently and uniformly.

Figure 5:
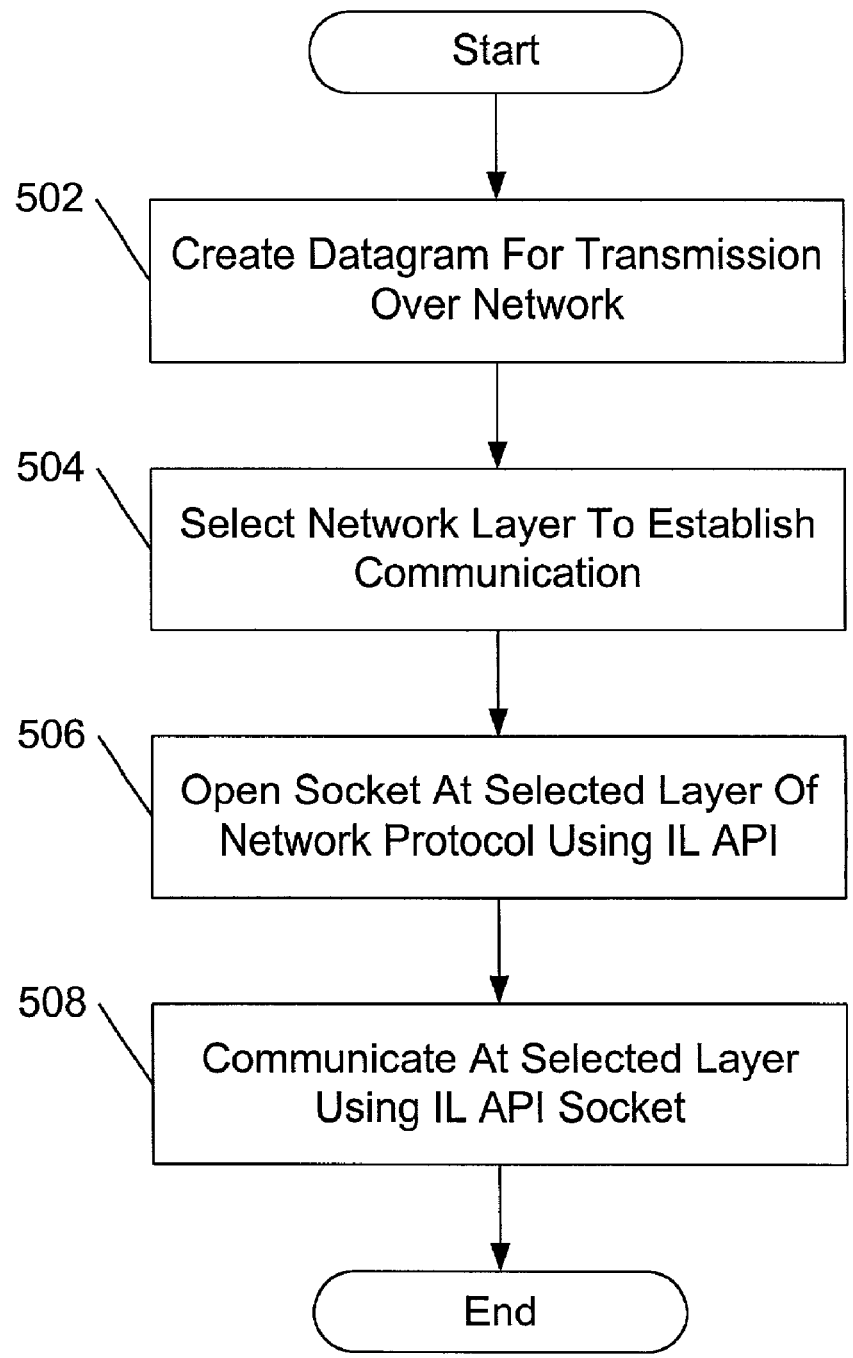
FIG. 5 is a flow-chart diagram illustrating the operations associated with communicating over the IP stack using the IL API.

FIG. 5 is a flow-chart diagram illustrating the operations associated with communicating over the IP stack using the IL API. Initially, an application creates a datagram to be transmitted over a network (502). The datagram or packet is self-contained, independent entity of data carrying sufficient information to be routed from the source to the destination computer without reliance on earlier exchanges between this source and destination computer and the transporting network. The packet needs to be self-contained without reliance on earlier exchanges because there is no connection of fixed duration between the two communicating points as there is, for example, in most voice telephone conversations. This kind of protocol is therefore referred to as connectionless.

Given several layers to communicate with, application selects a network layer to establish communication (504). In part, the layer selected depends on the type of datagram the application has created. If the application creates a transport session using a transport socket such as TCP 334 in FIG. 3, the application provides the data and necessary headers. However, a network session uses a network socket such as IP Socket 336 in FIG. 3 and the application needs to create the appropriate network layer TCP header or UDP header around the data or payload section of each packet. Similarly, if the application creates a link layer session using link socket 338 then the application must also include IP header information in the packet.

The application also selects a layer in the network protocol stack depending on the layer a resource associated with the network device uses for communication. For example, the ICMP and IGMP tables are resources that use the IP protocol because they communicate at the network layer in the protocol stack. Similarly, an ARP table is a resource that uses the link layer to communicate information about the network device, in particular an Ethernet or MAC address of the network device.

The application then opens a socket at the selected layer of the network protocol using the IL API (506). Often, the communication occurs over a "raw" type of socket rather than a "cooked" socket. The information is considered raw because control characters and other information in the data stream are not stripped out or interpreted by other programs before being delivered to the application. For example, two common types of packets sent or received over raw sockets are ICMP packets and IGMP packets. Specific resources such as routing tables, ICMP and IGMP tables are identified with predetermined or well-known socket identifiers. Applications open an inner layer socket using these specific socket identifiers to access the information in these particular resources. Alternatively, the application can open inner layer sockets with other socket identifiers to intercept other types of information being transmitted across the particular network protocol layer.

Communication continues between the application and the selected layer or specific resource until the application ends or the connection is terminated (508).

Figure 6:
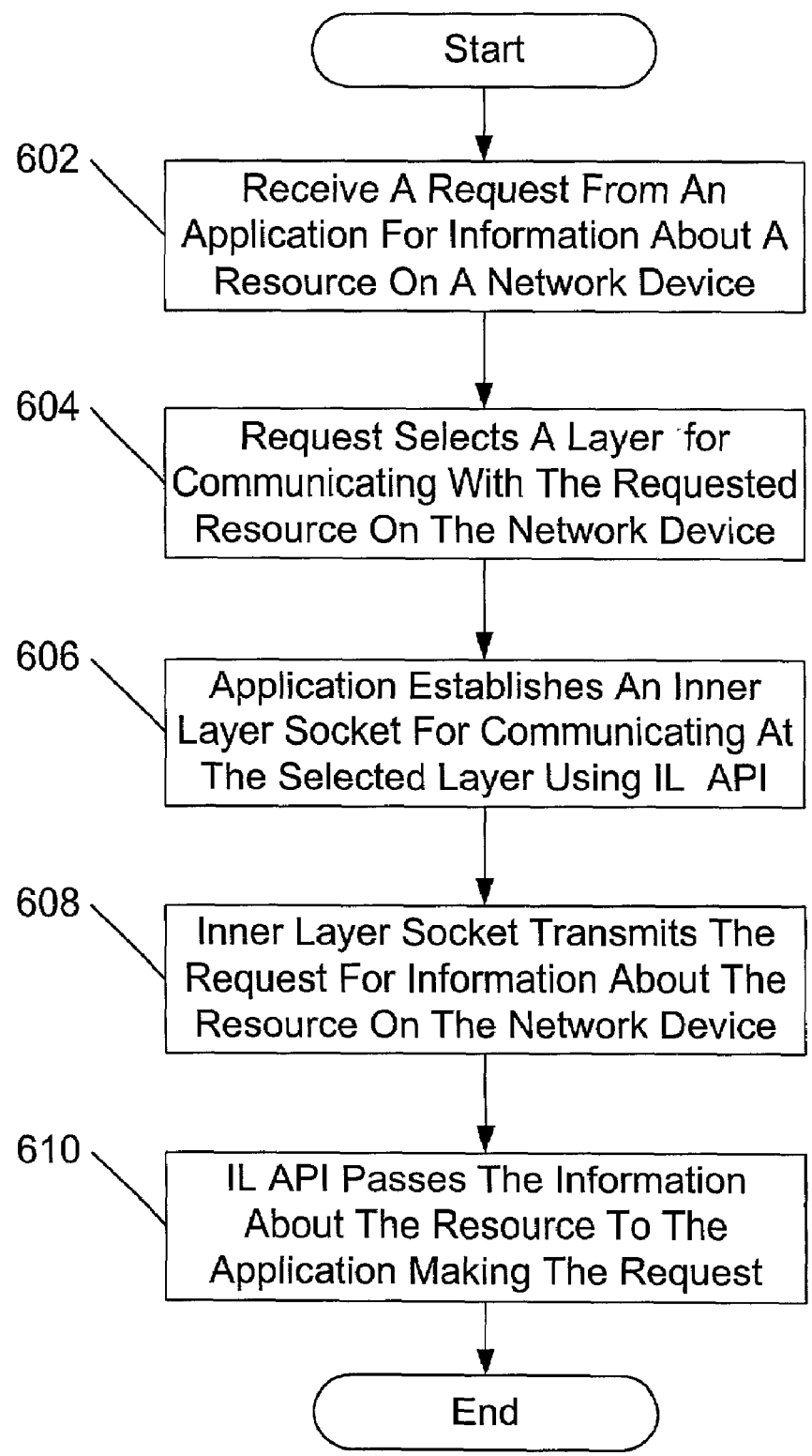
FIG. 6 is a flow-diagram depicting the operations used to access information about a resource associated with a network device.

FIG. 6 is a flow-diagram depicting the operations used to access information about a resource associated with a network device. Initially, a network device receives a request from an application for information about a resource associated with a network device (602). The resource can be a routing table, a table with ICMP or IGMP information, a table of physical ports on a network device, an ARP table of MAC addresses or any other resource associated with a network device. The request typically selects a layer in a network protocol stack for communicating with the requested resource on the network device (604). The application then establishes an inner layer socket for communicating at the selected layer using an inner layer application programming interface (IL API) and a socket identifier associated with the requested resource (606). The inner layer socket communicates using the selected layer and bypasses other layers in the network protocol stack. Once established, the inner layer socket transmits the request for information about the resource through the inner layer socket and the socket identifier (608). The IL API receives the information about the resource from the network device in response to the transmission made through the inner layer socket (610) and passes the information about the resource through the inner layer socket to the application making the request.

In one implementation using the Java object-oriented programming environment, an application may contain source code that generates and utilizes Java link layer sockets as shown in the following code example A.

Code Example A

Ethernet Packet ep=New Ethernet Packet (data, destination Ethernet Address);

Ethernet Socket s=New Ethernet Socket (source Ethernet Address);

Byte size;

Byte buffer=new byte[size];

s.send(ep);

s.rcv(buf);

The Code Example A details the use of a combination send/receive Java link layer socket "s" whose address is "source Ethernet Address". A datagram packet "ep" is created for use in an Ethernet networking environment, where "ep" is intended to be sent to a destination "destination Ethernet Address". A receive buffer "buf" is created for socket "s", and given size "size". After "ep" is sent by Java link layer socket "s", Java link layer socket "s" receives any return packets in buffer "buf".

Another example of the use of Java link layer sockets is given below in code example B.

Code Example B

```
Ethernet Address destination new Ethernet Address;
Ethernet Address source=new Ethernet Address;
Byte [ ]buf=new byte [2000];
Ethernet Packet ep=new Ethernet Packet (buf, destination);
    //put the data into the buffer buf
Ethernet Socket es=new Ethernet Socket (source);
es.send(ep);
es.receive(ep);
//now look at data in the buffer buf
```

In the code example B, a buffer "buf" is utilized as a bi-directional send/receive buffer for supporting the socket "es".

While specific implementations have been described herein for purposes of illustration, various modifications may be made without departing from the spirit and scope of the invention. For example, implementations and examples are provided with reference to TCP/IP however, an alternate implementation could also be adapted to work with the Open Systems Interconnection (OSI) network model. In the OSI communication model, IP is in layer 3, and other layers are as illustrated in FIG. 3. Inner sockets for the transport, network and data link layer are described but an inner socket for a physical layer could also be implemented. The physical layer would provide information about the ports on a network device and information about the physical media being used. Additional implementations could be created using conventional procedural programming languages such as "C" as well as object-oriented programming environments/languages such as Java or C++. Furthermore, although aspects of the present invention are described as being stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above-described embodiments, but instead is defined by the appended claims in light of their full scope of equivalents.

What is claimed is:

1. A method for communicating over a network protocol stack in a network, the method comprising:
    creating a packet through an application, the packet being a self-contained, independent entity of data including header information for routing the packet to from a source to a destination, the header information being associated with a layer in a multiple layer network protocol stack;
    selecting a layer in the multiple layer network protocol stack for communicating with the application;
    establishing an inner layer socket for communication between the application and the selected layer using an inner layer application programming interface (IL API), wherein the communication between the application and the selected layer bypasses other layers in the multiple layer network protocol stack; and
    transmitting the packet including the header information from the application to the selected layer through the inner layer socket;
    wherein the application communicates with the IL API using object-oriented instructions and the IL API interfaces with the multiple layer network protocol stack through instructions executable on a virtual-machine compatible with the multiple layer network protocol stack.

2. The method of claim 1, wherein the header information includes header information associated with a transport layer and the inner layer socket is a transport socket.

3. The method of claim 2, wherein the multiple layer network protocol stack is compatible with TCP/IP and the transport socket is compatible with a TCP or UDP transport layer protocol.

4. The method of claim 1, wherein the header information includes header information associated with a network layer and the inner layer socket is a network socket.

5. The method of claim 4, wherein the multiple layer network protocol stack is compatible with TCP/IP and the network socket is compatible with an IP network layer protocol.

6. The method of claim 1, wherein the header information includes header information associated with a link layer and the inner layer socket is a link socket.

7. The method of claim 6, wherein the multiple layer network protocol stack is compatible with TCP/IP and the link socket is compatible with a link layer protocol.

8. The method of claim 1, wherein selecting a layer in the multiple layer network protocol stack further includes selecting the layer in the multiple layer network protocol stack based on a type of the packet created by the application.

9. The method of claim 1, wherein the IL API further provides a transport socket to access transport layer information in the multiple layer network protocol stack, a network socket to access network layer information in the multiple layer network protocol stack, a link socket to access link layer information in the multiple layer network protocol stack, and a physical socket to access physical port information in the multiple layer network protocol stack.

10. The method of claim 1, wherein the IL API further provides a different socket communication interface for each layer of communication available in the multiple layer network protocol stack.

11. The method of claim 1, wherein the object-oriented instructions are compatible with a Java programming language.

12. The method of claim 11, wherein the application contains source code that generates and utilizes Java link layer sockets.

13. The method of claim 1, further comprising transmitting the packet from the source to the destination over the network based on the header information in the packet.

14. The method of claim 13, wherein the header information includes header information for routing the packet from a source computer to a destination computer.

15. An apparatus for communicating over a network protocol stack in a network, the apparatus comprising:
    a processor;
    a memory for storing instructions when executed on the processor that causes the processor to,
        create a packet through an application, the packet being a self-contained, independent entity of data including header information for routing the packet from a source to a destination, the header information being associated with a layer in a multiple layer network protocol stack;
        select a layer in the multiple layer network protocol stack for communicating with the application;
        establish an inner layer socket for communication between the application and the selected layer using an inner layer application programming interface (IL API), wherein the IL API is distinct from the application, and wherein the communication between the application and the selected layer bypasses other layers in the multiple layer network protocol stack; and transmit the packet including the header information from the application to the selected layer through the inner layer socket.

16. The apparatus of claim 15, wherein the header information includes header information associated with a transport layer and the inner layer socket is a transport socket.

17. The apparatus of claim 16, wherein the multiple layer network protocol stack is compatible with TCP/IP and the transport socket is compatible with a TCP or UDP transport layer protocol.

18. The apparatus of claim 15, wherein the header information includes header information associated with a network layer and the inner layer socket is a network socket.

19. The apparatus of claim 18, wherein the multiple layer network protocol stack is compatible with TCP/IP and the network socket is compatible with an IP network layer protocol.

20. The apparatus of claim 15, wherein the header information includes header information associated with a link layer and the inner layer socket is a link socket.

21. The apparatus of claim 20, wherein the multiple layer network protocol stack is compatible with TCP/IP and the link socket is compatible with a link layer protocol.

22. The apparatus of claim 15, wherein the instructions to cause a processor to select a layer in a network protocol stack further includes instructions to cause the processor to select the layer in the network protocol stack based on a type of the packet created by the application.

23. The apparatus of claim 15, wherein the IL API further provides a transport socket to access transport layer information in the multiple layer network protocol stack, a network socket to access network layer information in the multiple layer network protocol stack, a link socket to access link layer information in the multiple layer network protocol stack, and a physical socket to access physical port information in the multiple layer network protocol stack.

24. The apparatus of claim 15, wherein the IL API further provides a different socket communication interface for each layer of communication available in the multiple layer network protocol stack.

25. The apparatus of claim 15, wherein the application communicates with the IL API using object-oriented instructions and the IL API interfaces with the multiple layer network protocol stack through instructions executable on a virtual-machine compatible with the multiple layer network protocol stack.

26. The apparatus of claim 25, wherein the object-oriented instructions are compatible with a Java programming language.

27. The apparatus of claim 15, wherein the instructions further includes instructions to cause the processor to transmit the packet from the source to the destination over the network based on the header information in the packet.

28. The apparatus of claim 27, wherein the header information includes header information for routing the packet from a source computer to a destination computer.

29. An apparatus for accessing information about a resource associated with a network device, comprising:

means for creating a packet through an application, the packet being a self-contained, independent entity of data including header information for routing the packet from a source to a destination, the header information being associated with a layer in a multiple layer network protocol stack;

means for selecting a layer in the multiple layer network protocol stack for communication with the application;

means for establishing an inner layer socket for communication between the application and the selected layer using an inner layer application programming interface (IL API), wherein the IL API is distinct from the application, and wherein the communication between the application and the selected layer bypasses other layers in the multiple layer network protocol stack; and means for transmitting the packet including the header information from the application to the selected layer through the inner layer socket.

30. The apparatus of claim 29, further comprising means for transmitting the packet from the source to the destination over a network based on the header information in the packet.

31. A computer program, tangibly stored on a computer-readable medium, comprising instructions for communicating over a network protocol stack in a network, the computer program comprising instructions to:

create a packet through an application, the packet being a self-contained, independent entity of data including header information for routing the packet from a source to a destination, the header information being associated with a layer in a multiple layer network protocol stack;

select a layer in the multiple layer network protocol stack for communicating with the application;

establish an inner layer socket for communication between the application and the selected layer using an inner layer application programming interface (IL API), wherein the IL API is distinct from the application, and wherein the communication between the application and the selected layer bypasses other layers in the multiple layer network protocol stack; and transmit the packet including the header information from the application to the selected layer through the inner layer socket.

32. The computer program of claim 31, further comprising instructions to transmit the packet from the source to the destination over the network based on the header information in the packet.

* * * * *